(12) United States Patent
Mackin et al.

(10) Patent No.: US 8,006,831 B1
(45) Date of Patent: Aug. 30, 2011

(54) MULTIFUNCTION CONVEYOR SIDE EXTRUSIONS

(75) Inventors: Ryan Patrick Mackin, Moline, IL (US); Daniel James Burke, Cordova, IL (US); Bruce Alan Coers, Hillsdale, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/761,127

(22) Filed: Apr. 15, 2010

(51) Int. Cl.
*B65G 21/08* (2006.01)

(52) U.S. Cl. ..................... 198/860.1; 198/812

(58) Field of Classification Search .............. 198/860.1, 198/861.1, 812, 588
See application file for complete search history.

(56) References Cited

U.S. PATENT DOCUMENTS

| | | | |
|---|---|---|---|
| 2,760,706 A | 8/1956 | Pearl | |
| 2,957,543 A | 10/1960 | Larson | |
| 2,888,202 A | 6/1961 | Pampel et al. | |
| 3,024,893 A | 3/1962 | Lambert | |
| 3,451,506 A | 6/1969 | Neal | |
| 3,825,108 A | 7/1974 | Stone | |
| 3,878,937 A | 4/1975 | Glaser et al. | |
| 4,474,287 A * | 10/1984 | Thompson | 198/812 |
| 4,641,745 A | 2/1987 | Skates | |
| 4,681,501 A | 7/1987 | Edwards et al. | |
| 4,923,359 A | 5/1990 | Petri et al. | |
| 4,930,623 A | 6/1990 | Johnson et al. | |
| 4,981,207 A | 1/1991 | Kuikka | |
| 4,993,542 A | 2/1991 | Nomura | |
| 5,029,697 A | 7/1991 | McMillan et al. | |
| 5,156,260 A | 10/1992 | Dorner et al. | |
| 5,186,314 A * | 2/1993 | Clopton | 198/860.1 |
| 5,190,352 A | 3/1993 | LeBegue et al. | |
| 5,307,917 A | 5/1994 | Hall | |
| 5,361,894 A * | 11/1994 | Solcz | 198/860.1 |
| 5,487,462 A | 1/1996 | Gilmore | |
| 5,513,743 A | 5/1996 | Brink | |
| 5,913,404 A | 6/1999 | Bowman | |
| 6,068,111 A | 5/2000 | Smith et al. | |
| 6,422,382 B1 * | 7/2002 | Ertel et al. | 198/860.1 |
| 6,481,563 B1 | 11/2002 | Gilmore | |
| 6,666,325 B1 * | 12/2003 | Buenning et al. | 198/860.1 |
| 6,871,737 B2 | 3/2005 | Ertel et al. | |
| 7,114,615 B1 * | 10/2006 | Karpy | 198/860.1 |
| 7,152,730 B2 * | 12/2006 | Gerke | 198/860.3 |
| 7,168,555 B2 * | 1/2007 | Peterson | 198/812 |
| 7,370,753 B2 | 5/2008 | Yang et al. | |
| 7,395,918 B2 | 7/2008 | Thompson | |
| 7,556,144 B2 | 7/2009 | Cotter et al. | |
| 7,571,802 B2 | 8/2009 | Bowman | |
| 7,735,638 B2 * | 6/2010 | Hau et al. | 198/860.1 |
| 2009/0013617 A1 | 1/2009 | Johannsen | |

* cited by examiner

*Primary Examiner* — James R Bidwell (57) ABSTRACT

A first extruded side rail (102, 104, 120, 122) of an endless belt conveyor (100) includes several extruded profiles (298, 299, 309, 319, 329, 335, 337, 341, 347, 371, 375, and 381). The extruded profiles (298, 299, 309, 319, 329, 335, 337, 341, 347, 371, 375, and 381) perform different functions that permit the conveyor (100) to be made lighter and of fewer parts and with greater precision.

10 Claims, 5 Drawing Sheets

MULTIFUNCTION CONVEYOR SIDE EXTRUSIONS

FIELD OF THE INVENTION

The invention relates generally to endless belt conveyors. In particular it relates to extrusions forming the frames of these conveyors.

BACKGROUND OF THE INVENTION

Agricultural combines are typically equipped with screw conveyors to unload the combines. In these arrangements, a cantilevered screw conveyor is extended from the side of the agricultural combine and suspended with its free cantilevered end in the air, generally at an angle of about 20°. The free cantilevered end is suspended in the air over the side of a vehicle (typically a truck or wagon). This vehicle travels alongside the agricultural combine as it travels through the field.

A large reservoir in the agricultural combine, which is commonly called a grain tank or hopper, is unloaded via this screw conveyor as the combine and vehicle travel through the field. Typically it takes less than 5 minutes to unload 400 bushels of grain in the grain tank into the accompanying vehicle.

One problem with these screw conveyors is their limited capacity. Screws can only operate at limited speed to keep grain damage within reasonable limits. Enlarging a screw conveyor such that it can unload at a higher rate from a larger capacity modern combine requires that the screw conveyor be significantly enlarged. Unfortunately, any significant enlargement would require a much thicker and heavier screw conveyor, which would overbalance the combine do not only to the greater mass of the screw conveyor, but to the larger volume of grain inside the conveyor helix.

It has been proposed to replace the screw conveyor with an endless belt conveyor (or conveyors) in new high capacity agricultural combines. Until now this has not been deemed practical, since an endless belt conveyor would suffer from many of the same problems that the screw conveyor suffers from. Endless belt conveyors typically require multiple idler rollers, heavy frames, and other numerous parts. They take considerable time to assemble, have numerous additional parts and are heavy. For this reason they are not suited to be used as cantilevered conveyors attached to vehicles going over rough terrain at relatively high speed. A screw conveyor, in contrast, typically has only two parts: a cylindrical tube and a rotating helical auger disposed inside the tube.

To provide a practical endless belt conveyor for agricultural combine unloading systems the problems of weight, assembly time and cost must be solved.

As part of the solution to this problem, the applicants have proposed that extrusions, preferably light metal extrusions, be used as the frame of the conveyor. By using extrusions, many additional parts can be eliminated by designing in specific extrusion profiles that can perform the additional functions necessary for a high speed endless belt conveyor.

U.S. Pat. No. 6,012,568 discloses an adjustable conveyor for conveying printed circuit boards in a printed circuit board manufacturing facility. The conveyor uses extrusions best shown in FIG. 5, with multiple cavities that are used to support the printed circuit board, and to guide an endless belt. This conveyor has two separate side rails, each with its own drive mechanism, with two endless belts, on disposal in each of the side rails.

SUMMARY OF THE INVENTION

A first extruded side rail is disclosed for a conveyor that comprises an elongate frame upon which an endless belt recirculates. The side rail comprises a single unitary web of extruded material with several extruded profiles that perform specific function in the conveyor. By providing these profiles in the extruded side rail, the conveyor can be manufactured of fewer parts and with greater precision, since the additional intermediate parts normally used to provide these various functions add additional weight and introduce additional dimensioning errors.

The particular extruded profiles that the applicants have found valuable include (1) a first profile configured to be removably fixed directly to a shaft mount of a shaft of an idler roller, (2) a second profile configured to be fixed directly to an elongate planar sheet upon which an endless belt of the conveyor runs, (3) a third profile configured to be fixed directly to an elongate conveyor belt skirt disposed against a top surface of the endless belt, (4) a fourth profile configured to directly support for longitudinal sliding relative movement a mating profile of a side rail of an extendable and retractable conveyor extension to the conveyor, (5) a fifth profile configured to be fixed directly to a cover extending over the top of the endless belt of the conveyor, and (6) a sixth profile configured to be fixed directly to a cross member that is also fixed directly to a second extruded side rail of the frame.

Each one of these profiles on an extruded conveyor side rail is believed to be novel and inventive. Consequently, any two of these profiles on an extruded conveyor side rail are also believed to be novel. At least any three or even four of these profiles is believed to be novel and inventive.

The first profile may comprise an extruded surface disposed to support the idler roller for rotation about an axis that is disposed below the second profile and above the sixth profile. The fourth profile may be disposed below the first profile and the side rail of the extendable and retractable conveyor extension may be configured to be disposed below the idler roller. The third profile may include an extruded surface upon which the skirt is mounted and may also include an elongate slot having facing extruded surfaces that are configured to receive a plurality of threaded fasteners that hold the elongate skirt against the extruded surface. The second profile may include a planar extruded flange that extends inwardly from a vertically extending web of the first extruded side rail and horizontally. The fourth profile may extend inwardly from a vertically extending web of the first extruded side rail and may have an upper and upwardly facing lobe and a lower and downwardly facing lobe, said lobes being defined by extruded surfaces. The fifth profile may include an elongate extruded slot having facing extruded surfaces configured to threadedly engage fasteners that hold the cover to the first extruded side rail.

DETAILED DESCRIPTION OF THE PREFERRED EMBODIMENTS

In the discussion below, the terms "profile" or "extruded profile" or the like, refer to one or more surface profiles that are generated by an extrusion process. An extrusion process permits the formation of elongate surface structures of precise dimensions. The term "inner" when used herein refers to a direction closer to the end of the conveyor that is attached to the combine. This is also the input end of the conveyor. The term "outer" when used herein refers to the direction away from the combine and toward the other end of the conveyor that is cantilevered. This is also the output end of the conveyor. The material-carrying portion of the conveyor belt always travels from the inner end to the outer end. The term "longitudinal" when used to describe an extrusion means in the direction of the extrusion. "Longitudinal" when used in terms of the conveyor means in a direction parallel to the direction of movement of the conveyor belt. "Transverse", or "lateral, or light turns mean a direction at a right angle to the longitudinal direction and at a right angle to the direction of travel of the conveyor belt. "Vertical" means the direction perpendicular to the conveying surface of the conveyor belt. "Horizontal means a direction parallel to the surface of the conveyor belt. In the conveyors disclosed herein, all the extruded members are light metal extrusions, typically aluminum alloys. All of the members that join the extrusion are also light metal extrusions or rolled members, typically aluminum alloy rod or sheet members.

Two surfaces that are "directly" connected (as that term is used herein) may have a thin layer of another material disposed in between such as shim stock, gasketing, washers, or a layer of adhesive and may be made of other materials such as cork, plastic, aluminum, brass, in which this intermediate material is planar and serves a non-structural purpose, such as to reduce vibration communicated between the directly connected parts, to thermally isolate the directly connected parts, electrically isolate the directly connected parts, to permit slight thermal expansion between the directly connected parts, to make the joint between the directly connected parts waterproof, or to more closely and permanently bond the directly connected parts together. All of the members that are described herein as being connected to one another are preferably directly connected.

All of the surfaces and profiles of the extruded side members described herein are formed by the extrusion process.

Figure 1:
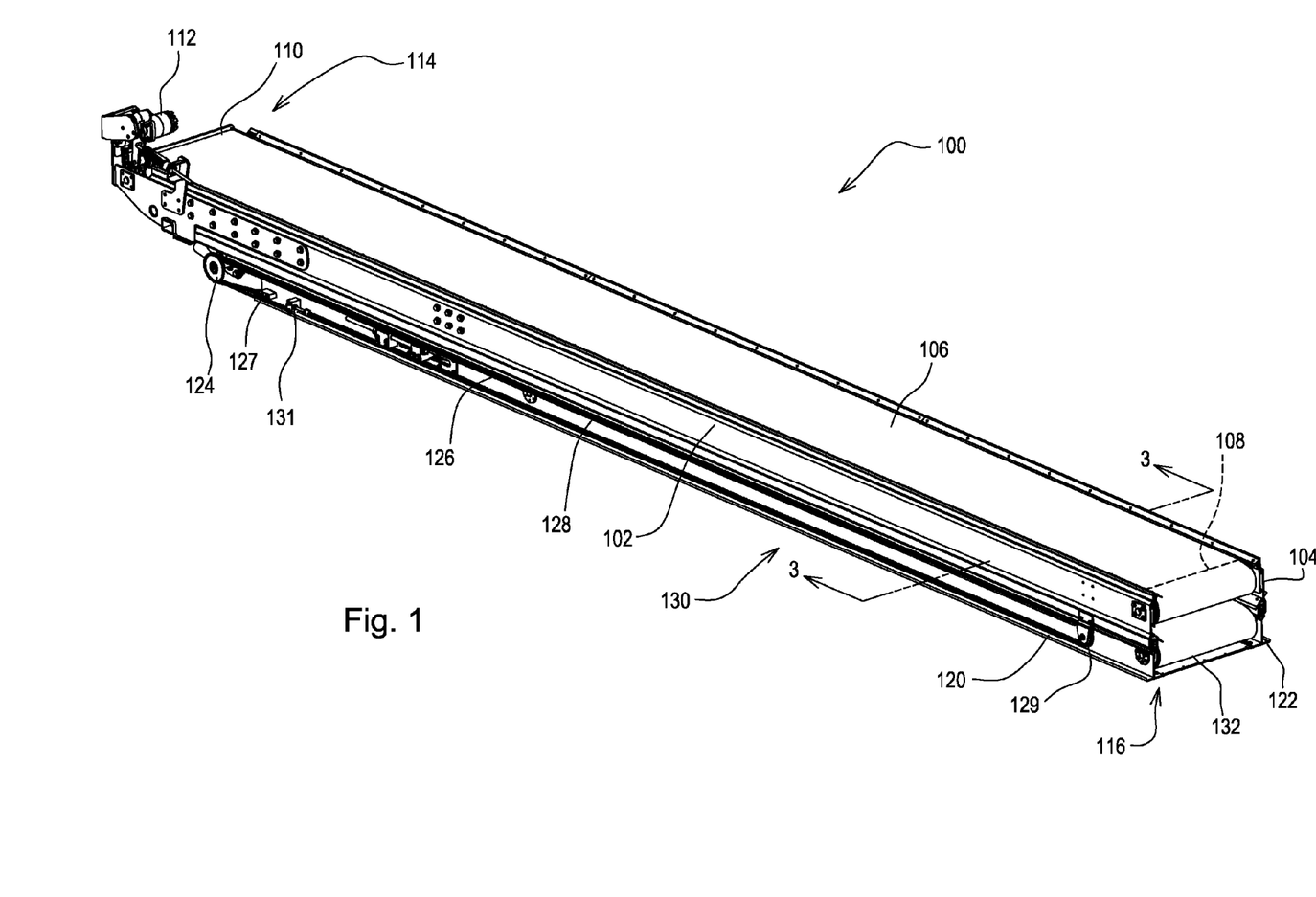
FIG. 1 illustrates a perspective view of an endless belt conveyor using extruded side rails in accordance with the present invention.
Figure 2:
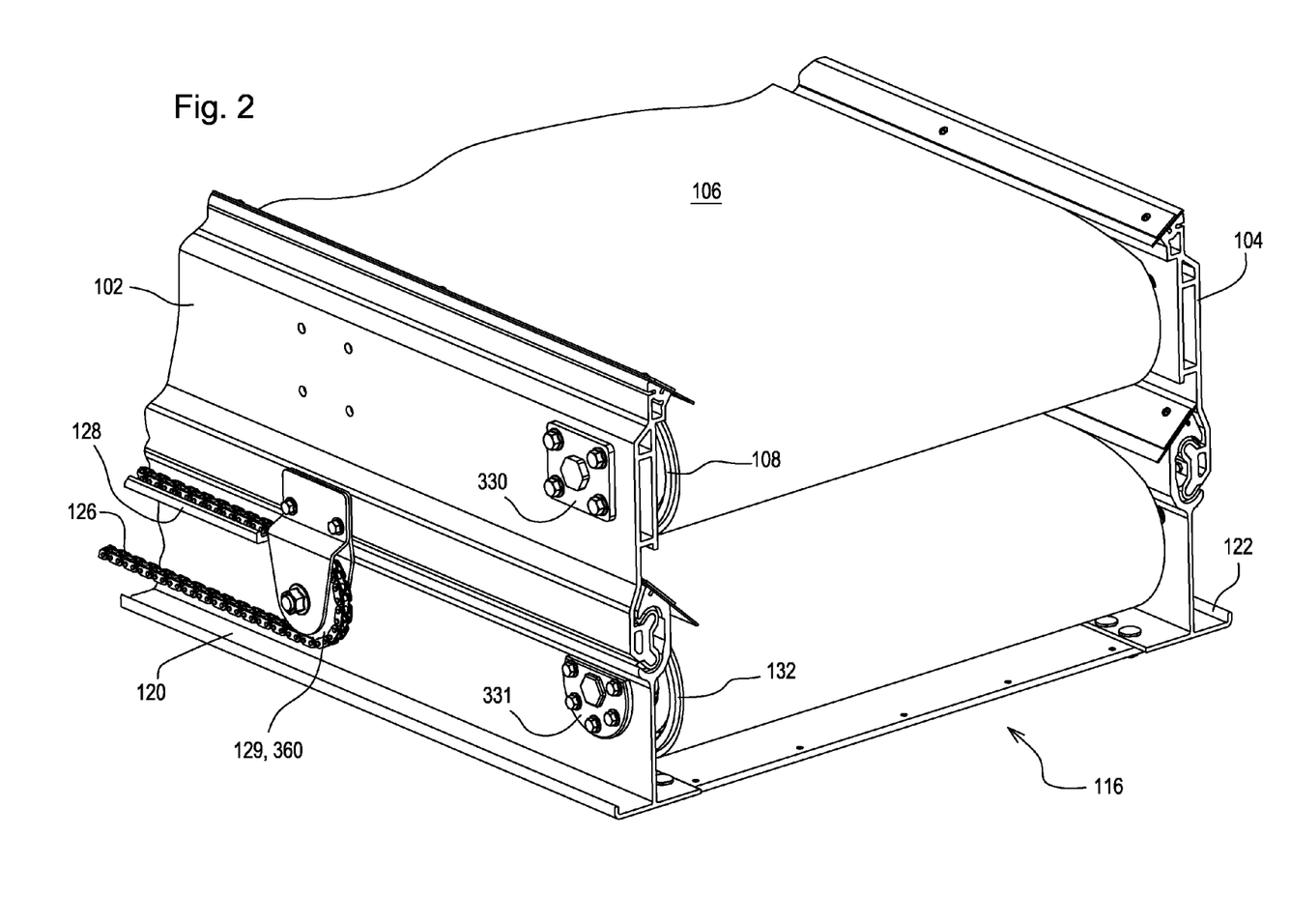
FIG. 2 is a close-up view of the outer cantilevered free end of the endless belt conveyor.

In FIGS. 1-2, an endless belt conveyor 100 includes two upper extruded side rails 102, 104 that extend substantially the entire length of the endless belt conveyor 100. The endless belt conveyor 100 has an inner end 114 that is supported at the side of the agricultural combine, and an outer end 116 that is cantilevered in the air away from the side of the agricultural combine. The outer end 116 extends upward with respect to the inner end 114 at an angle of approximately 20° when the endless belt conveyor 100 is in its operating position for unloading the agricultural combine.

The upper extruded side rails 102, 104 of conveyor 100 are oriented generally vertically as best shown in FIG. 2. They support two rollers 108, 110 that are disposed at opposite ends of the endless belt conveyor 100. The rollers 108, 110, in turn, support an endless belt 106.

Roller 108 is driven in rotation by a motor 112 that is fixed to the inner end 114 of the conveyor. The outer end 116 of the conveyor supports the second roller 108, which is an idler roller.

The two rollers 108, 110 are fixed to inwardly facing surfaces of each upper extruded side rail 102, 104 on shaft mounts 330 that permit the rollers to rotate with respect to the side rails about the longitudinal axes of the rollers 108, 110. Endless belt 106 wraps around the two rollers 108, 110 through an angle of approximately 180°.

Roller 132 is fixed to inwardly facing surfaces of each lower extruded side rail 120, 122 on shaft mounts 331 that permit the roller to rotate with respect to the side rails about the longitudinal axes of roller 132. The endless belt 106 wraps around roller 132 through an angle of approximately 180°.

A first drive member 124, here shown as a sprocket, is mounted on the inner end of conveyor 100, preferably adjacent to the inner end of upper extruded side rail 102, and drivingly engages a chain 126 that wraps halfway around first drive member 124. Chain 126 has an upper run that is carried in a chain support 128, which is an extruded profile of upper extruded side rail 102. Chain 126 has a lower run that extends forward toward the outer end of conveyor 100 to an anchor point 127 on lower extruded side rail 120 to which chain 126 is fixed.

A second drive member 129, here shown as a sprocket, is removably fixed for free rotation to the outer end of the upper extruded side rail 102 and engages the outer end of the upper run of chain 126 at the point the upper run exits chain support 128. Chain 126 wraps halfway around second drive member 129 and extends rearward toward the inner end 114 of endless belt conveyor 100 underneath the upper run of chain 126. The lower run of chain 126 is fixed to anchor point 131 on lower extruded side rail 120.

Endless belt conveyor 100 has a second extendable conveyor portion 130 that is disposed underneath the two upper side rails 102, 104 and rollers 108, 110. The second extendable conveyor portion 130 is configured to extend outward toward the right ("right" as it appears in FIG. 1) with respect to the two upper side rails 102, 104 and rollers 108, 110.

The second extendable conveyor portion 130 is formed of two lower extruded side rails 120, 122 that are slidingly supported on the two upper extruded side rails 102, 104, respectively and the associated hardware and components that couple the two together. Extruded profiles on the two lower extruded side rails engage mating extruded profiles on the two upper extruded side rails such that the two lower extruded side rails can slide longitudinally with respect to the two upper extruded side rails, thereby permitting the second extendable conveyor portion 130 to slide longitudinally with respect to the first conveyor 100.

When first drive member 124 is driven in rotation in a first rotational direction (i.e. counterclockwise as shown in FIG. 1), it causes the lower extruded side rails 120, 122 to slide out from underneath the upper extruded side rails 102, 104 thereby extending the overall length of endless belt conveyor 100 to the right (as shown in FIG. 1).

When first drive member 124 is driven in rotation in the second rotational direction opposite the first rotational direction (i.e. clockwise as shown in FIG. 1), it causes the lower extruded side rails 120, 122 to slide back underneath the upper extruded side rails 102, 104 thereby reducing the overall length of endless belt conveyor 100.

Second extendable conveyor portion 130 also includes a roller 132 that is configured to support a loop of endless belt 106 over an angle of approximately 180°. Roller 132 is disposed between the two lower extruded side rails. Roller 132 is supported at each end on the two lower extruded side rails for rotation about its longitudinal axis.

The longitudinal axes of all the rollers that support and guide the endless belt 106 on endless belt conveyor 100 (whether mounted for rotation on the upper extruded side rails 102, 104, or mounted on the lower extruded side rails 120, 122) are all parallel to each other. Further, the longitudinal axes of all the rollers extend in a generally horizontal direction during operation and are disposed at right angles to the longitudinal extent of the upper extruded side rails and lower extruded side rails on which they are supported for rotation.

The two upper extruded side rails 102, 104 are mirror images of each other and the two lower extruded side rails 120, 122 are also mirror images of each other. They are mirrored about a plane that is normal to the longitudinal axis of the rollers that extend between them.

Figure 3:
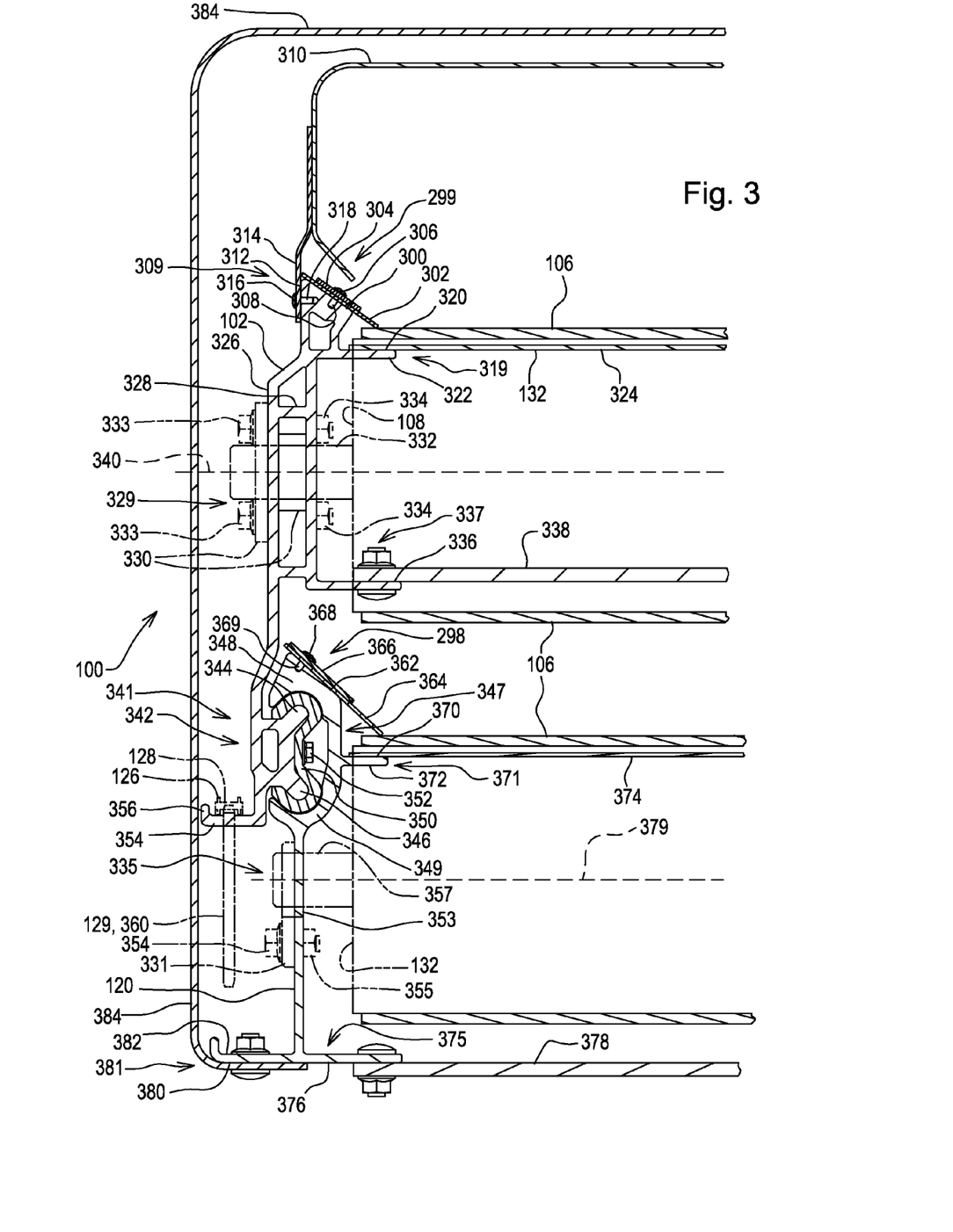
FIG. 3 is a cross-sectional view through the conveyor in a direction perpendicular to the longitudinal extent of the extrusions forming the frame of the conveyor taken at section line 3-3 in FIG. 1.

FIG. 3 illustrates the left side ("left" as shown in FIGS. 1-2) arrangement of upper and lower extruded side rails 102, 120, respectively. The arrangement of upper and lower extruded side rails and their associated hardware and components that form the right hand side of the endless belt conveyor 100 are identical to those on the left hand side of the conveyor (shown in FIG. 3). The only difference is that the left and right side arrangements are mirror images of each other.

Upper and lower extruded side rails 102, 120 are elongate and extend substantially the entire length of the endless belt 106 from the inner end 114 to the outer end 116. Upper extruded side rail 102 is oriented generally vertically, i.e. it is taller than it is wide (best shown in FIG. 3). Upper extruded side rail 102 extends perpendicular to the rotational axes of the rollers 108, 110 in both the longitudinal direction (i.e. in the direction of extrusion) and in a vertical direction. Upper extruded side rail 102 extends from a point above the top surface of idler roller 108 and drive roller 110 to a point below the bottom surface of idler roller 108 and drive roller 110.

The upper portion of upper extruded side rail 102 has an extruded profile 299 that is configured to be fixed directly to an elongate conveyor belt skirt disposed against the top surface of the endless belt 106.

Extruded profile 299 defines a mounting surface 300 to which skirt 302 is releasably fixed. Skirt 302 is preferably flexible, and preferably made of a polymeric strip or brush that is planar. It is held against mounting surface 300 by a skirt retainer, here shown as a metal strip 304. Metal strip 304, like skirt 302, extends substantially the entire length of the upper extruded side rail 102. Metal strip 304 is held against skirt 302 by threaded fasteners 306. Metal strip 304 has a higher modulus of elasticity and therefore serves to distribute the load provided by threaded fasteners 306 over substantially the entire surface of skirt 302. Threaded fasteners 306 extend through holes in metal strip 304 and through holes or slots in skirts 302 and are screwed into another extruded profile, here shown as extruded slot 308.

Extruded slot 308 is formed as two generally parallel, planar and facing surfaces that are disposed substantially the same distance apart over their entire length. This extruded profile is formed in extruded profile 299 and engages threaded fasteners 306 on two sides of the threaded fasteners thereby holding the fasteners in slot 308, and holding metal strip 304 against skirt 302. The threaded fasteners 306 are self tapping, and make their own mating threads in the side walls of extruded slot 308. In this way, the process of forming a row of tapped holes in the side rails of the conveyor is avoided.

Furthermore, as long as corresponding holes in metal strip 304 or in skirt 302 are located along a straight line, the spacing between adjacent holes does not matter, since any point along the extruded slot 308 can be tapped. The bottom edge of skirt 302 is disposed immediately adjacent to or abutting endless belt 106. Skirt 302 is stationary as endless belt 106 is driven around the conveyor rollers. Skirt 302 functions as a side wall to the flat endless belt 106, thereby preventing crop material from getting into the space between idler roller 132 and endless belt 106.

In the preferred embodiment, a threaded fastener 306 is inserted through corresponding holes and slots in metal strip 304 and skirt 302 every 20 to 40 cm along the length of upper extruded side rail 102. The advantage of providing a slot 308 that extends the length of upper extruded side rail 100 into, is that different skirts 302 and metal strips 304 with different hole-in-slot spacings can be quickly and easily attached to and removed from upper extruded side rail 102 without the necessity of drilling additional holes in the upper extruded side rail 102 to receive the threaded fasteners 306.

Further, since the slot is an extruded profile, and since the rollers are similarly mounted to another extruded profile, no precision machining of any of the extruded side rails is necessary to ensure that the skirts are attached at precisely the correct position with respect to endless belt 106 to ensure proper alignment. The height of the top surface of belt 106 is determined by the height of the planar sheet 324 on which is rests. The height of the planar sheet is determined by its manufacturing process. Typically, the planar sheet will be an aluminum sheet formed precisely by a rolling or extrusion process and therefore its thickness (i.e. its height) will be extremely consistent. The position of the planar sheet with respect to the extruded slot 308 will also be precisely formed since the planar sheet 324 rests upon an extruded profile of upper extruded side rail 102 and extruded slot 308, as an extruded profile, will be in a precise position (in a direction toward or away from the surface of endless belt 106) with respect to skirt 302. Clearly, skirt 302 is not held in a precise position with respect to endless belt 106 in a longitudinal direction. It can be moved inward and outward in a longitudinal direction, however, without affecting its spacing toward or away from endless belt 106. It is this relative spacing between skirt 302 and endless belt 106 that needs to be maintained for good performance: close enough to prevent grain from leaking out, get far enough apart to prevent rubbing and burning.

The upper portion of upper extruded side rails 102 also includes another extruded profile 309 that is configured to be fixed directly to a cover 310 extending over the top of the endless belt 106 of the conveyor 100.

Extruded profile 309 includes a planar surface 312 that extends generally vertically, and to which a lower vertical surface 314 of cover 310 is attached. Threaded fasteners 316 attach cover 310 to planar surface 312, extending into another extruded profile, which includes an elongate slot 318 that extends the entire length of upper extruded side rail 102. Spaced apart holes are formed in lower vertical surface 314 of cover 310 to receive threaded fasteners 316. Elongate slot 318 has two inwardly facing planar and parallel surfaces that are spaced equidistantly apart and are dimensioned such that when threaded fastener 316 is screwed into elongate slot 318, the fastener threadedly engages both surfaces simultaneously thereby holding fast in elongate slot 318.

Figure 4:
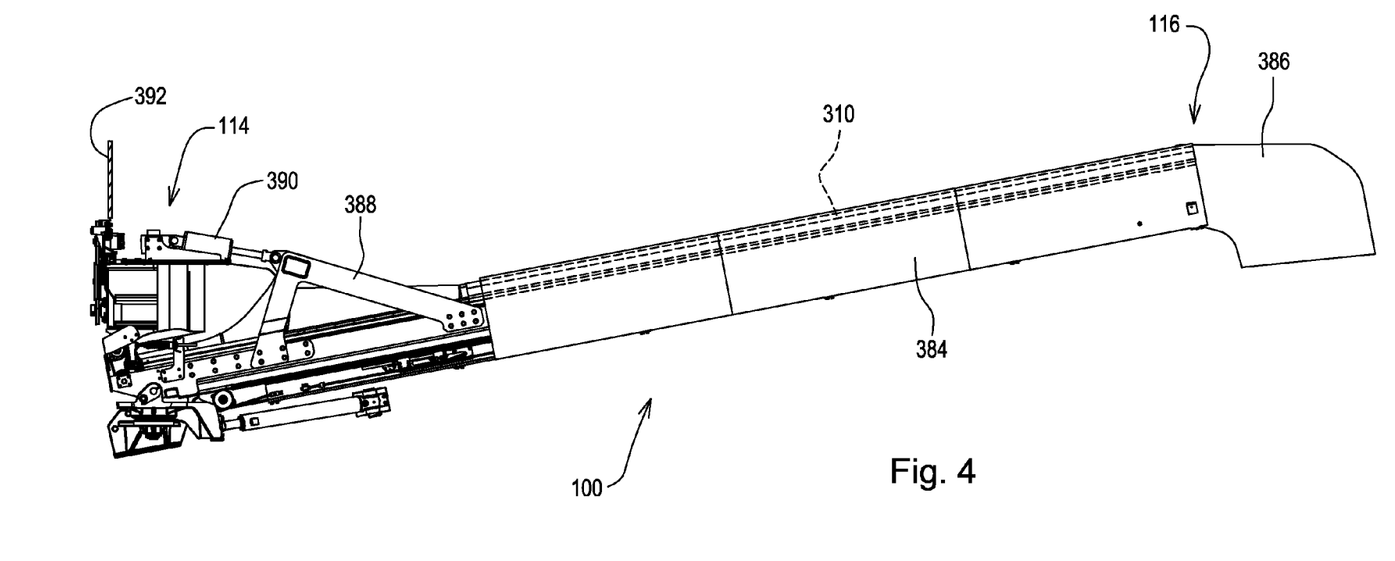
FIG. 4 is a side view of endless belt conveyor showing the additional elements that support the conveyor in a cantilevered position on the side of an agricultural combine, and also the covers that enclose the conveyor.

Cover 310 extends longitudinally substantially the entire length of the upper extruded side rail 102 as shown in dashed lines in FIG. 4. Although it is shown cut away (FIG. 3), it extends completely across the top of endless belt 106 and has an identical (but mirror image) shape that connects to identical mirror image profiles on the upper extruded side rail 104 on the other side of endless belt conveyor 100.

The upper portion of upper extruded side rail 102 has an additional extruded profile 319 that is configured to be fixed directly to an elongate planar sheet 324 all which endless belt 106 of conveyor 100 runs. The extruded profile 319 includes a flange 322 that extends horizontally and inwardly from a vertical web of upper extruded side rail 102, and has a planar surface 320.

Planar sheet 324 is removably attached to planar surface 320 at a first (leftmost in FIG. 3) longitudinal edge of planar sheet 324. Planar sheet 324 has a second (rightmost) longitudinal edge parallel to the first longitudinal edge and disposed on the other side of planar sheet 324 that is similarly removably fastened to a mirrored extruded structure on upper extruded side rail 104. Thus, planar sheet 324 extends between and is coupled to both of the upper extruded side rails 102, 104, and joins them together.

The upper surface of planar sheet 324 supports endless belt 106 across its entire width and supports endless belt 106 over substantially the entire length of endless belt conveyor 100 to thereby support endless belt 106 as it travels from drive roller 110 to idler roller 108. This supporting arrangement permits belt 106 to be made quite thin, on the order of 3-6 mm thick. Since the conveyor does not have intermediate rollers, there is no need to excessively tension the belt as it would otherwise have to be tensioned to assume a flat orientation for carrying crop, nor to thicken it as it would otherwise have to be thickened to make it assume a flat shape as it travels suspended in air between supporting rollers. The belt provides intimate and virtually continuous support over the entire operating length of the belt.

The provision of a planar sheet 324 also permits the conveyor to eliminate the intermediate steel idler rollers that are typically provided in an endless belt conveyor between the drive roller at one end and the idler roller at the other.

Air can be introduced into the gap by a grid or array of air passages formed in planar sheet 324. These are passages that extend completely through planar sheet 324 from its bottom surface to its top surface (the surface abutting endless belt 106) and provide for are to be drawn through planar sheet 324 into the space between endless belt 106 and the top surface of planar sheet 324, thereby providing a film of air as an air bearing that reduces the belt-on-sheet friction and thereby extend the life of the belt and of the planar sheet 324. Alternatively, grooves can be formed in the upper surface of planar sheet 324 that extend from the outside edge of the planar sheet toward the center of the planar sheet in the direction of travel of the endless belt 106. With this arrangement, the relative movement of the belt 106 and the planar sheet 324 can draw air into the gap between the two and further reduce friction.

The middle portion of upper extruded side rail 102 defines another extruded profile 329, here shown as an enclosed box 326 that is oriented generally vertically, having a height greater than a width. An internal rib 328, horizontally oriented, extends from side to side within the enclosed box 326 to provide internal support and help prevent the box from collapsing. A shaft mount 330 is located at least partially within the enclosed box 326 and is configured to support the shaft 332 of idler roller 108 (here shown in phantom lines) about which idler roller 108 rotates. Four threaded fasteners 333 extend through vertical sidewalls of enclosed box 326 and are secured with nuts 334 on an inside surface of upper extruded sidewall 102 to removably fix shaft mount 330 within enclosed box 326.

The middle portion of upper extruded side rail 102 also defines another extruded profile 337 that is configured to be fixed directly to a cross member 338 that is also fixed directly to a second extruded side rail of the conveyor frame. In this case the second extruded side rail is the upper extruded side rail 122 located on the right side of the endless belt conveyor 100.

Extruded profile 337 includes a planar surface 336. Planar surface 336 is configured to be removably fixed to laterally extending cross members 338 that, like planar sheet 324, are fixed to a mirror image structure on the opposing upper extruded side rail 104. Cross members 338 do not support endless belt 106, which passes below them. They are provided for structural support and together with the upper portion of upper extruded sidewalls 102, 104 and planar sheet 324 define a rectangular structure that resists twisting. The rotational axis 340 of idler roller 108 is disposed vertically between planar sheet 324 and cross members 338 such that the longitudinal tension generated by endless belt 106 pulling drive roller 110 and idler roller 108 is transferred to the upper extruded side rails 102, 104 generally at the vertical midpoint of the box defined by planar sheet 324 and cross members 338. This enhances the stability of the endless belt conveyor 100.

The lower portion of upper extruded side rail 102 includes another extruded profile 341 that is configured to directly support for longitudinal sliding relative movement of mating profile of another side rail (in this case the other side rail is lower extruded side rail 120).

Extruded profile 341 includes an elongate linear slide member 342. Elongate linear slide member 342 further comprises two spaced apart linear slide members 344, 346 having an outer bearing surface formed as convex semicircular lobes.

The central axes of the semicircular lobes are spaced apart in disposed to one above the other in a vertical orientation such that the central axis of the upper semicircular lobe is disposed above the central axis of the lower semicircular lobe.

This arrangement permits the semicircular lobes to not only support the lower extruded side rail upon the upper extruded side rail, but also to resist twisting of the side rails with respect to each other about a longitudinal axis. The linear slide members 344, 346 are configured to extend into and be supported by another extruded profile 347 in the form of a mating linear slide member, here shown as two linear slide members 348, 349 that are formed in the upper portion of lower extruded side rail 120. The 2 linear slide members 348, 349 have extruded semicircular concave surfaces each having a central axis corresponding to the central axes of linear slide members 344, 346, respectively, such that the central axis of the upper semicircular concave lobe is disposed above the central axis of the lower semicircular concave lobe.

Extruded profile 347 of lower extruded side rail 120 is configured to directly support for longitudinal sliding relative movement a mating profile of another side rail (in this case, upper extruded side rail 102).

The linear slide members on the upper and lower extruded side rails may touch each other, or (as shown in FIGS. 2-3) may be separated by an antifriction strip 350, preferably made of polyethylene, polypropylene, tetrafluoroethylene, nylon, or other wear resistant polymeric material. Antifriction strip 350 wraps around the two lobes 344, 346 and is in intimate sliding contact with the semicircular surface of linear slide members 348, 349 over substantially its entire length, and extends substantially the entire length of the gap between the interengaging surfaces of the upper and lower extruded side rails. In this manner, the weight of the cantilevered second extendable conveyor portion 130 is distributed evenly over the entire length of the mating linear slide members, which permits the extrusions to be made thin-walled and of a lighter weight per unit length than an extendable side rail supported on an upper conveyor by spaced apart rollers.

Antifriction strip 350 extends substantially the entire length of upper extruded sidewall through 100 into a lower extruded side wall 120 with the same profile is shown in cross section in FIG. 3. Antifriction strip 350 is removably fixed to linear slide member 342 at a vertical position between the two lobes 344, 346 with a series of threaded fasteners 352 that extend through a series of holes in antifriction strip 350 and are threadedly engaged with upper extruded side rail 102. Antifriction strip 350 is preferably extruded in the shape shown in FIG. 3.

The lower portion of upper extruded side rail 102 includes another extruded profile, here shown as the chain support 128. Chain support 128 as extruded defines a surface that is generally horizontal and upwardly facing. Chain support 128 has an outer lip 356 which is configured to prevent chain 126 from sliding laterally off chain support 128. Chain support 128 extends substantially the entire length of upper extruded side rail 102 and is configured to guide chain 126 to second drive member 129 here shown as a sprocket 360. Sprocket 360 is removably fixed on upper extruded side rail 102 for free rotation with respect to upper extruded side rail 102.

A mirror image chain support profile is provided on upper extruded side rail 104 together with a mirror chain and sprocket arrangement. A mirror image to first drive member 124 is provided on the opposite side of endless belt conveyor 100 (as shown in FIG. 1) to drive that chain in exactly the same manner as described above. This means that the lower extruded side rail on the right side of the endless belt conveyor 100 is both extended and retracted by drive forces applied simultaneously and in equal measure to both of the lower extruded side rails 120, 122. This advantageously reduces frictional forces resisting the extension of the lower extruded side rails 120, 122.

The upper portion of lower extruded side rail 120 has an extruded profile 298 that is configured to be fixed directly to an elongate conveyor belt skirt disposed against the top surface of endless belt 106. Extruded profile 298 has a mounting surface 362 to which a stationary conveyor sidewall, here shown as elongate conveyor belt skirt 364, is removably fixed. Skirt 364 is preferably flexible, and preferably made in the form of a polymeric strip or brush that is planar, and is held against surface 362 by a skirt retainer, here shown as metal strip 366. Metal strip 366, like skirt 364, extends substantially the entire length of the lower extruded side rail 120. Metal strip 366 is held against skirt 364 by threaded fasteners 368. Threaded fasteners 368 extend through holes in metal strip 366 and through slots in skirts 364 and are threaded into an extruded profile, here shown as extruded slot 369 that is formed as two planar and facing surfaces disposed substantially the same distance apart over their entire length. This extruded slot 369 is formed in extruded profile 298 and engages threaded fasteners 368 on two opposing sides of the threaded fasteners thereby holding the fasteners in slot 369, and holding metal strip 366 against skirt 364. The bottom edge of skirt 364 is disposed immediately adjacent to or abutting endless belt 106. Skirt 364 is held stationary, fixed to lower elongate side rail 120, as endless belt 106 is driven around the conveyor rollers. Skirt 364 functions as a side wall to the flat endless belt 106, preventing crop material from getting into the space between idler roller 132 and endless belt 106.

In the preferred embodiment, a threaded fastener 368 is inserted through corresponding holes and slots in metal strip 366 and skirt 364 every 20 to 40 cm along the length of lower extruded side rail 120. An advantage of providing a slot 369 that extends the length of lower extruded side rail 120, is that different skirts 364 and metal strips 368 with different hole and slot spacings can be quickly and easily attached to and removed from lower extruded side rail 120 without the necessity of drilling additional holes in the lower extruded side rail 120 to receive the threaded fasteners 368.

Further, since the slot 369 is an extruded profile, and since the rollers are similarly mounted to another extruded profile, no precision machining of any of the extruded side rails is necessary to ensure that the skirts are attached at precisely the correct position with respect to endless belt 106 to ensure proper alignment. The height of the top surface of belt 106 is determined by the height of the planar sheet 374 on which it rests. The height of the planar sheet is determined by its manufacturing process. Typically, the planar sheet will be an aluminum sheet formed precisely by a rolling or extrusion process and therefore its thickness (i.e. its height) will be extremely consistent. The position of the planar sheet 374 with respect to the extruded slot 369 will also be precisely formed since the planar sheet 374 rests upon an extruded profile of lower extruded side rail 120 and extruded slot 369, as an extruded profile, will be in a precise position (in a direction toward or away from the surface of endless belt 106) with respect to skirt 364. Clearly, skirt 364 is not held in a precise position with respect to endless belt 106 in a longitudinal direction. It can be moved inward and outward in a longitudinal direction, however, without affecting its spacing toward or away from endless belt 106. It is this close relative spacing between skirt 364 and endless belt 106 that needs to be maintained for good performance: close enough to prevent grain from leaking out, get far enough apart to prevent rubbing and burning.

The upper portion of lower extruded side rail 120 has an additional extruded profile 371 that is configured to be fixed directly to an elongate planar sheet 374 upon which endless belt 106 of conveyor 100 runs. The extruded profile 371 includes a flange 372 that extends horizontally and inwardly from a vertical web of lower extruded side rail 120, and has a planar surface 370.

Planar sheet 374 is removably attached to planar surface 370 at a first longitudinal edge of planar sheet 374. Planar sheet 374 has a second longitudinal edge parallel to the first longitudinal edge and disposed on the other side of planar sheet 374 that is similarly a removably fastened to a mirror structure on lower extruded side rail 122. Thus, planar sheet 374 extends between and is coupled to both of the lower extruded side rails 120, 122, and joins them together. The upper surface of planar sheet 374 supports endless belt 106 across its entire width and supports endless belt 106 over the length of second extendable conveyor portion 130.

This supporting arrangement permits belt 106 to be made quite thin, on the order of 3-6 mm thick. It also permits the second extendable conveyor portion 130 to eliminate the intermediate idler rollers that are typically provided to support the center section of an endless belt between the idler rollers at each end. These intermediate idler rollers add significantly to the weight of an endless belt conveyor.

By providing this intimate planar contact between the underside of endless belt 106 and the top surface of planar sheet 374, air can be introduced into the gap by a grid or array of air passages formed in planar sheet 374 (not shown). These are passages extend completely through planar sheet 374 from its bottom surface to its top surface (the surface abutting endless belt 106) and provide for are to be drawn through planar sheet 374 into the space between endless belt 106, and the top surface of planar sheet 374, thereby providing a film of air that functions as an air bearing to reduce belt-on-planar-sheet friction and thereby extend the life of the belt and of the planar sheet 374.

Another extruded profile 335 is provided at the middle of lower extruded side rail 120 and is configured to be removably fixed directly to shaft mount 331. Extruded profile 335 includes a vertically extending planar web 353 that is configured to be fixed to shaft mount 331.

Five threaded fasteners 354 extend through planar web 353 and are secured with nuts 355 on an inside surface of planar web 353 to removably fix shaft mount 331 to extruded profile 335.

Shaft mount 331 preferably extends at least partially into an aperture in planar web 353 to more precisely locate shaft mount 331 with respect to lower extruded side rail 120. Shaft mount 331 supports one end of shaft 357, thereby permitting idler roller 132 to rotate about rotational axis 379 of shaft 357 and idler roller 132.

The rotational axis 379 of idler roller 132 is disposed vertically between planar sheet 374 and cross members 378 such that the tension in endless belt 106 is transferred to the lower extruded side rails 120, 122 generally at the vertical midpoint of the box defined by planar sheet 374 and cross members 378. This enhances the stability of the endless belt conveyor 100.

The lower portion of lower extruded side rail 120 also defines another extruded profile 375 that is configured to be fixed directly to a cross member 378 that is also fixed directly to a second extruded side rail of the conveyor frame. In this case the second extruded side rail is lower extruded side rail 122 located on the right side of endless belt conveyor 100.

Extruded profile 375 includes a planar surface 376. Planar surface 376 is configured to be removably fixed to laterally extending cross members 378 that, like planar sheet 374, are fixed to a mirror image structure on the other lower extruded side rail 122. Cross members 378 do not support endless belt 106, which passes above them. They are provided for structural support and, together with the upper portion of lower extruded sidewalls 120, 122 and planar sheet 374, define a rectangular structure that resists twisting.

The lower portion of lower extruded side rail 120 also defines another extruded profile 381 that is configured to be fixed directly to a cover 384 extending over the top of the endless belt 106 of the conveyor 100.

Extruded profile 381 includes an extruded planar surface 380. Planar surface 380 is the lower surface of extruded flange 382, which sends horizontally and laterally outward from lower extruded side rail 120. Planar surface 380 serves as a mounting for conveyor cover 384. Conveyor cover 384 extends upward around the outside of upper and lower extruded side rails 102, 120, and horizontally across the top of endless belt conveyor 100. As with the other elements in FIG. 3, cover 384 is configured identically but in mirror image on the opposite side of endless belt conveyor 100, and mates to an identical mirror image flange on lower extruded side rail 122. Conveyor cover 384 extends around the outside surface of conveyor 310, including around the outside surface of cover 310. Since conveyor cover 384 is fixed to the lower extruded side rails 120, 122, when those side rails are extended, conveyor cover 384 extends along with them.

In the preferred embodiment, when the lower extruded side rails 120, 122 are extended as far as they can be extended with respect to upper extruded side rails 102, 104, the entire conveyor is still covered by either conveyor cover 384 or conveyor cover 310. Conveyor cover 384 overlaps conveyor cover 310 in this fully extended positions such that rain (for example) falling on conveyor cover 384 will drip downward on to conveyor cover 310 without falling on endless belt 106 or the crop being conveyed thereon.

FIG. 4 illustrates the endless belt conveyor 100 with conveyor covers 310, 384. Exit spout 386 is shown attached to the outer end 116. A bridle 388 is shown removably fixed to upper extruded side rails 102, 104. A hydraulic cylinder 390 is attached to bridle 388 at one end, and is attached to the side 392 of the agricultural combine at the other end, thus supporting the endless belt conveyor 100 as a cantilevered beam from the inner end 114 of the conveyor 100. Hydraulic circuitry, not shown, is configured to raise and lower endless belt conveyor 100 to an optimum height for unloading. In FIG. 4, the outer end 116 of endless belt conveyor 100 is raised about 20° above horizontal. This is a typical angle at which the endless belt conveyor 100 will be operated to unload the agricultural combine. In this position, water will drip from cover 384 to cover 310 when the endless belt conveyor 100 is extended.

In the preferred embodiment, a single endless belt 106 is wrapped about the driven rollers and idler rollers on the upper extruded side rails 102, 104 and on the idler rollers that are mounted for rotation on the lower extruded side rails 120, 122.

Figures 5, 6:
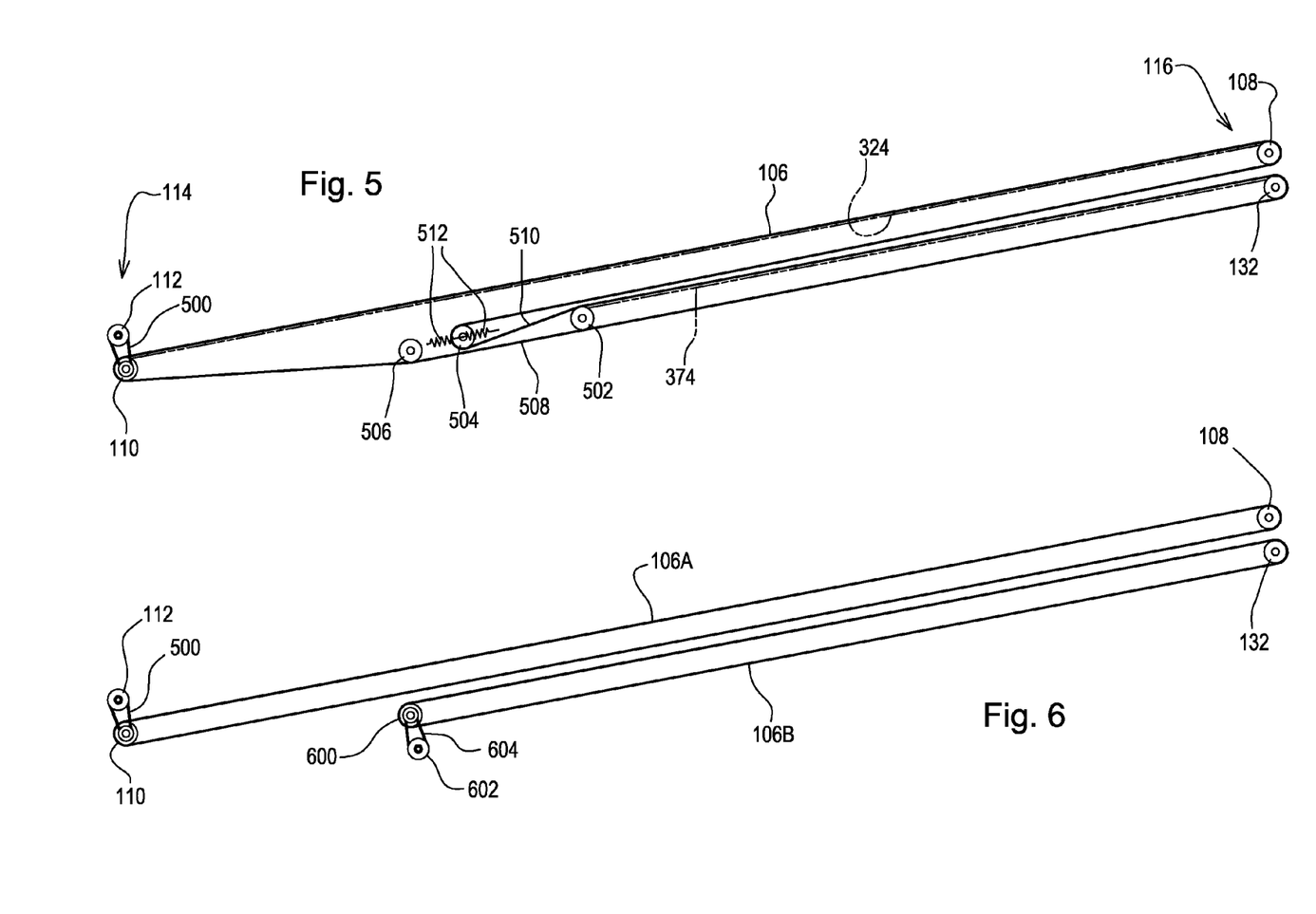
FIG. 5 is a side view of the endless belt conveyor in the same orientation is shown in FIG. 4 showing the arrangement of the endless belt 106 and the rollers about which it is wrapped.
FIG. 6 is an alternative endless belt conveyor arrangement for the conveyor mechanical system described and shown in FIGS. 1-5 in which two separate endless belts are shown, one supported on the upper extruded side rails of the conveyor, and the other supported on the lower extruded side rails of the conveyor.

FIG. 5 illustrates the preferred arrangement of the endless belt 106 together with the various rollers that are mounted for rotation on the upper and lower extruded side rail portions and support endless belt 106. In FIG. 5, the endless belt 106 is disposed at the same angle as shown in FIG. 4.

There are six rollers illustrated in FIG. 5 that support and guide the endless belt 106. Drive roller 110 is supported for rotation at each end on upper extruded side rails 102, 104. It is driven by motor 112. A belt 500 couples motor 112 to drive roller 110. Drive roller 110 is mounted to and between upper extruded side rails 102, 104 exactly the same as idler roller 108 is mounted between upper extruded side rails 102, 104 in FIG. 3. Four additional idler rollers are mounted to and between lower extruded side rails 120, 122. These idler rollers include idler roller 132 located at the outer end 116 of endless belt conveyor 100, and idler rollers 502, 504, 506 which are mounted in a middle longitudinal region of lower extruded side rails 120, 122 more toward inner end 114 of endless belt conveyor 100. Idler rollers 502, 506 serve to deflect the web of endless belt 106 only from other structures thereby preventing endless belt 106 from rubbing up against the various stationary mechanical components are rubbing up against other portions of endless belt 106. In particular, idler roller 506 of deflects the lower web of endless belt 106 downwards so that belt portions 508 and 510 will not rub against each other where they pass each other at idler roller 504. Idler roller 502 lifts belt portion 510 to the same height as the upper surface of planar sheet 374, which is shown in FIG. 5 as a dashed line. In this manner, endless belt 106 is prevented from wearing against the edge of planar sheet 374.

Whenever the lower extruded side rails are extended forward, all of idler rollers 132, 502, 504, 506 are extended forward at the same time, since they are also mounted for rotation on and between the lower extruded side rails. The effect of this roller arrangement is that slack is automatically taken up and removed to maintain the endless belt 106 under relatively constant tension over its entire range of lower extruded side rail extension and retraction. To help maintain this constant tension in endless belt 106, idler roller 504 is supported on spring-loaded mounts by springs 512 that are disposed between the spring-loaded mounts and the lower extruded side rails.

In the above-described embodiments, endless belt conveyor 100 includes two conveyor sections each conveyor section mounted on separate frames, a first frame comprised of the upper extruded side rails and the various hardware mounted to and between them, and the second frame comprised of the lower extruded side rails and the various hardware mounted to and between them. The endless belt 106 is wrapped around both conveyor sections so it can be driven by a single drive motor 112. The belt 106 wraps around roller 108 through an angle of about 180 degrees, reversing direction and returning underneath the upper extruded side rails 102, 104 until it wraps around idler roller 504, and again reverses direction and traveling outwardly as the crop-carrying upper surface of endless belt 106 of second extendible conveyor portion 130.

In an alternative configuration shown in FIG. 6, two separate endless drive belts are provided, including one drive belt 106A that is mounted for rotation on drive roller 110 and idler roller 108, and also including a second drive belt 106B that is mounted for rotation on drive roller 600 and idler roller 132. Drive roller 600 is driven by motor 602 which is coupled to drive roller 600 by a belt 604. This embodiment eliminates two of the rollers in the previous embodiment of FIGS. 1-5, but requires an additional motor to drive the second belt. In all other respects, the embodiments are identical. In the embodiment of FIG. 6, drive roller 600 is mounted to and between lower extruded side rails 120, 122 with a horizontal axis of rotation parallel to the axis of idler roller 132, idler roller 108, and drive roller 110.

The invention claimed is:

1. A first extruded side rail (102, 104, 120, 122) for a conveyor (100) that comprises an elongate frame upon which an endless belt (106, 106A, 106B), recirculates, the side rail (102, 104, 120, 122) comprising a single unitary web of extruded material, said web having a plurality of extruded profiles, said plurality of extruded profiles comprising at least two members of the group comprising,
    (1) a first profile (329, 335) configured to be removably fixed directly to a shaft mount (330, 331) of a shaft (332, 357) of an idler roller (110, 132),
    (2) a second profile (319, 371) configured to be fixed directly to an elongate planar sheet (324, 374) upon which an endless belt (106) of the conveyor (100) runs,
    (3) a third profile (299, 298) configured to be fixed directly to an elongate conveyor belt skirt (302, 364) disposed against a top surface of the endless belt (106),
    (4) a fourth profile (341, 347) configured to directly support for longitudinal sliding relative movement a mating profile (347, 341) of another side rail (102, 104, 120, 122) of the conveyor (100),
    (5) a fifth profile (309, 381) configured to be fixed directly to a cover (310, 384) extending over the top of the endless belt (106) of the conveyor (100),
    (6) a sixth profile (337, 375) configured to be fixed directly to a cross member (338, 378) that is also fixed directly to a second extruded side rail (102, 104, 120, 122) of the frame.

2. The first extruded side rail (102, 104, 120, 122) of claim 1, wherein the plurality of extruded profiles comprises at least three members of the group.

3. The first extruded side rail (102, 104, 120, 122) of claim 1, wherein the plurality of extruded profiles comprises at least four members of the group.

4. The first extruded side rail (102, 104, 120, 122) of claim 1, wherein the plurality of extruded profiles includes at least the first profile (329, 335), and further wherein the first profile (329, 335) comprises an extruded surface (326, 353) that is disposed to support the idler roller (110, 132) for rotation about an axis (340, 379) that is disposed below the second profile (319, 371) and above the sixth profile (337, 375).

5. The first extruded side rail (102, 104) of claim 1, wherein the plurality of extruded profiles includes at least the fourth profile (341), and further wherein the fourth profile (341) is disposed below the first profile (329) and further wherein the side rail (120, 122) of the extendable and retractable conveyor extension is configured to be disposed below the idler roller (110).

6. The first extruded side rail of claim 1, wherein the plurality of extruded profiles includes at least the third profile (299, 298), and further wherein the third profile (299, 298) comprises an extruded mounting surface (300, 362) upon which the skirt (302, 364) is mounted and an extruded slot (308, 369) having facing extruded surfaces that are configured to receive a plurality of threaded fasteners (306, 368) that hold the skirt (302, 364) against the extruded mounting surface (300, 362).

7. The first extruded side rail of claim 1, wherein the plurality of extruded profile includes at least the second profile (319, 371), and further wherein the second profile (319, 371) comprises a planar extruded flange (322, 372) that extends both inwardly from a vertically extending web of the first extruded side rail and horizontally in transverse cross section.

8. The first extruded side rail (102, 104) of claim 1, wherein the plurality of extruded profiles includes at least the fourth profile (341), and further wherein the fourth profile extends inwardly from a vertically extending web of the first extruded side rail (102, 104) and has an upper linear slide member (344), and a lower linear slide member (346), each of which having an outer bearing surface formed as convex lobes.

9. The first extruded side rail (102, 104) of claim 1, wherein the plurality of extruded profiles includes at least the fifth profile (309), wherein the fifth profile comprises an extruded slot (318) having facing extruded surfaces configured to threadedly engage fasteners that fix the cover (310) to the first extruded side rail (102, 104).

10. The first extruded side rail (102, 104) of claim 1, wherein the another side rail (120, 122) is a side rail (120, 122) of an extendable and retractable conveyor extension to the conveyor (100).

* * * * *